Dec. 2, 1930.  A. R. GROB  1,783,363
SYSTEM FOR HANDLING FREIGHT AND APPARATUS THEREFOR
Filed April 16, 1928  4 Sheets-Sheet 2
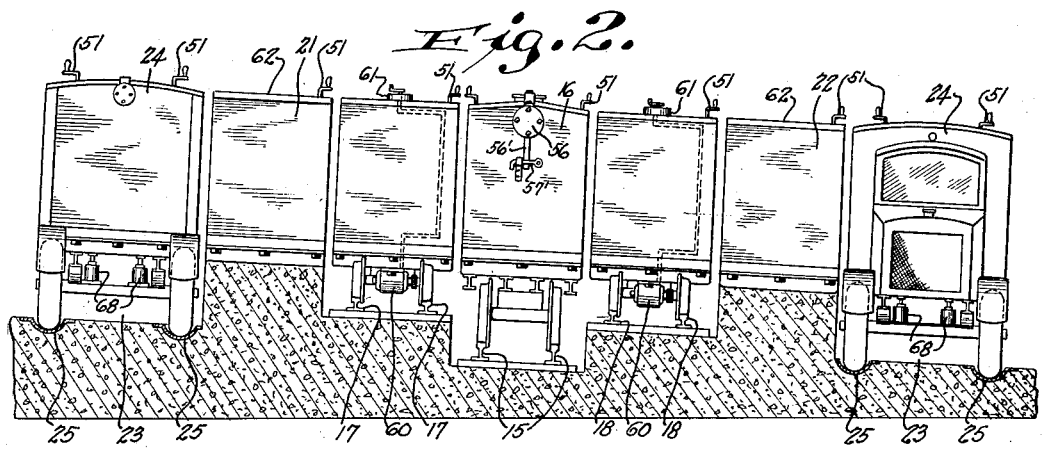
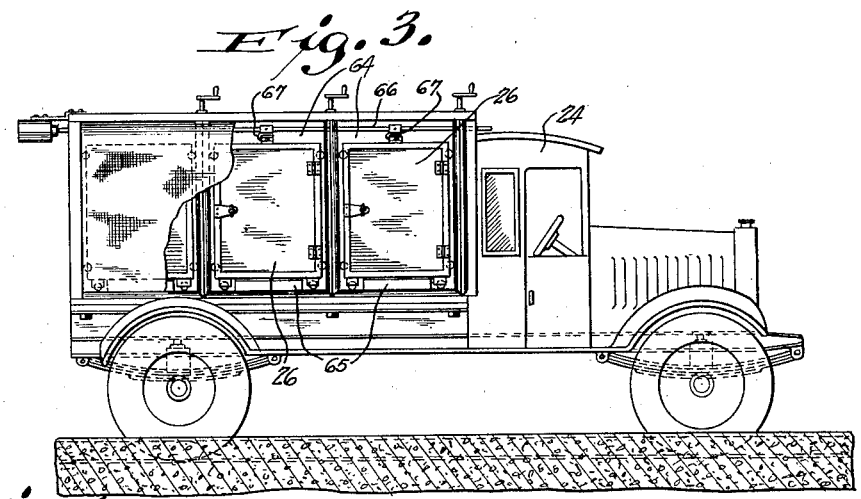
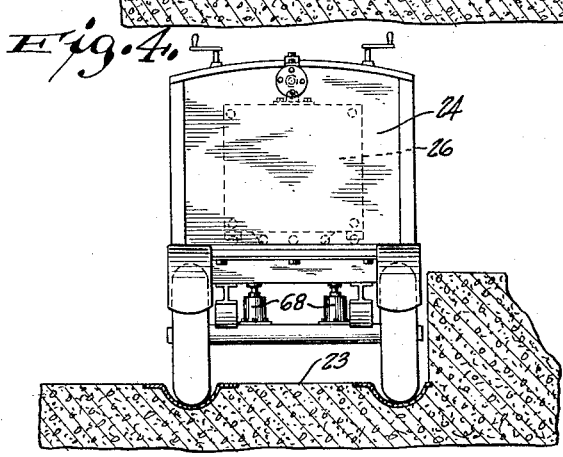
INVENTOR.
Armin R. Grob,
BY
Morsell, Keeney & Morsell,
ATTORNEYS.

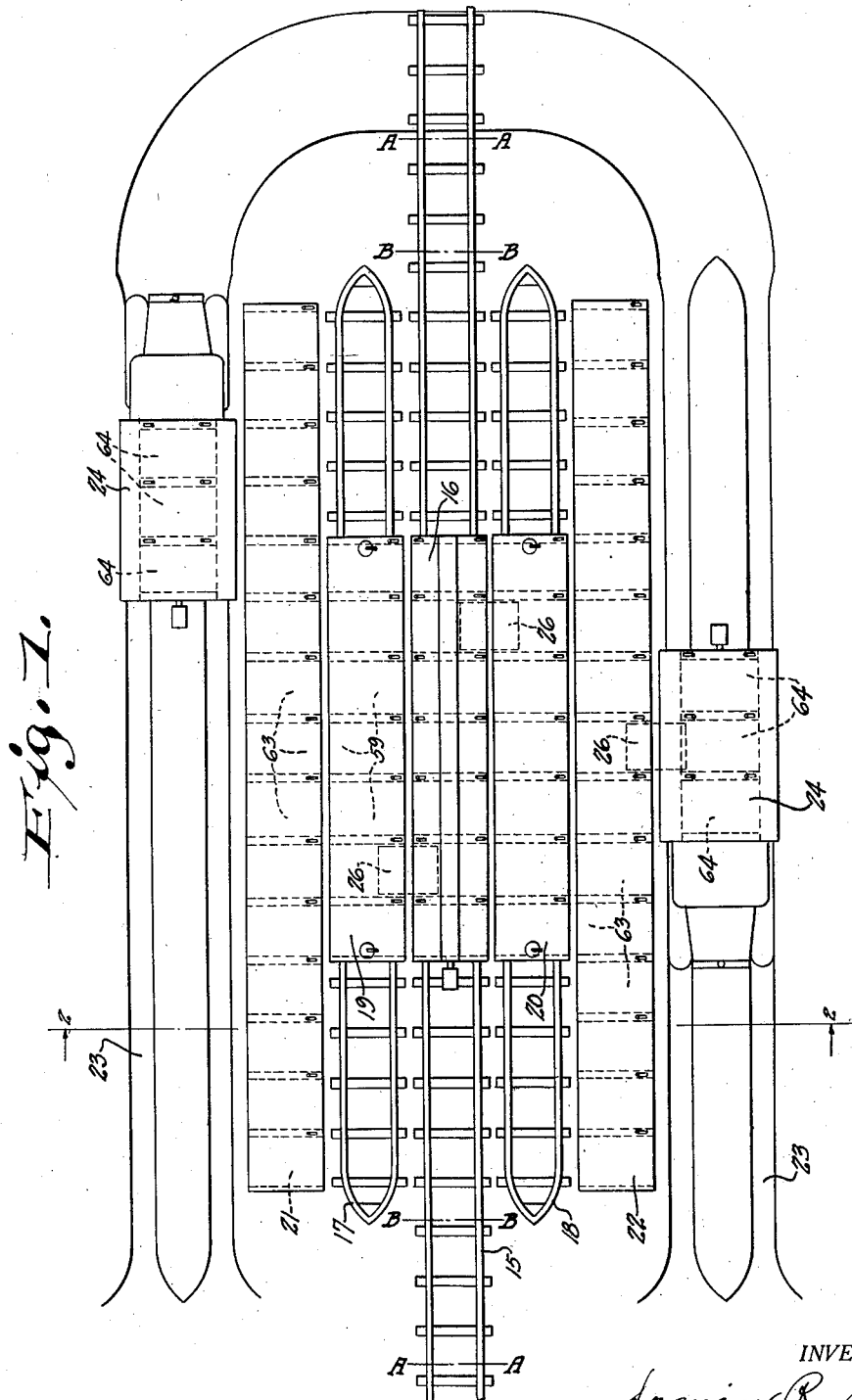

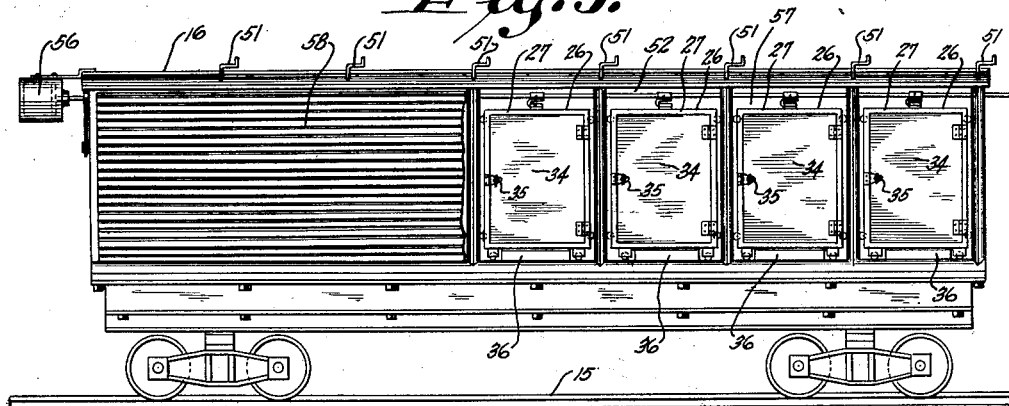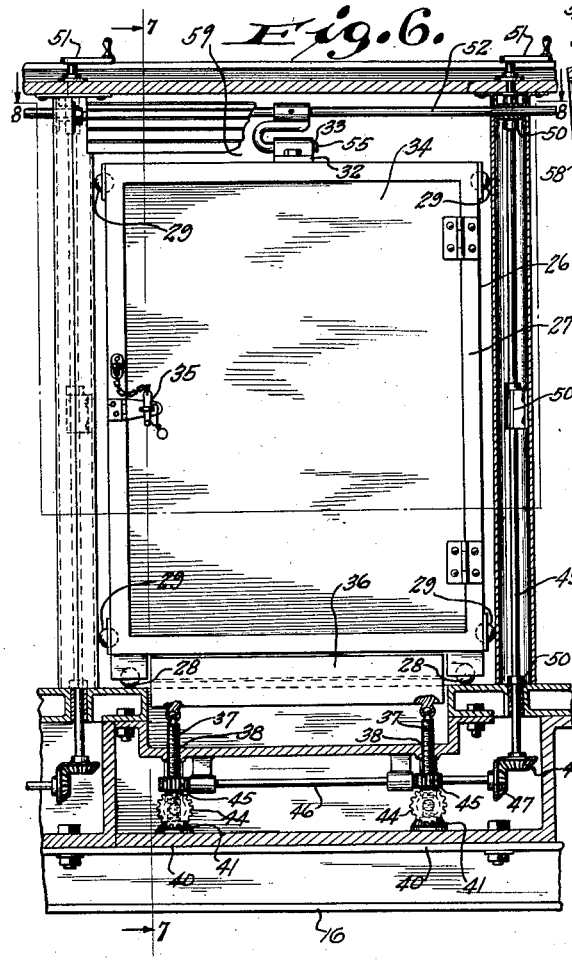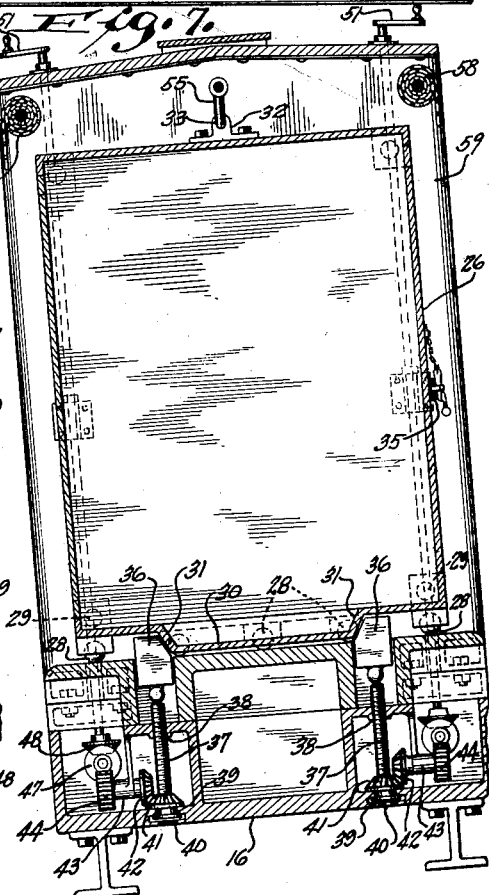

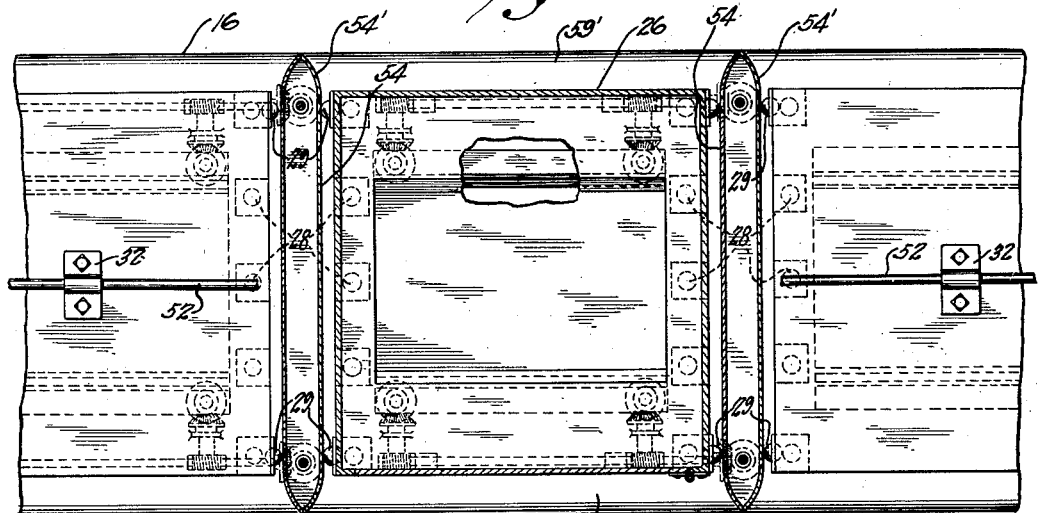
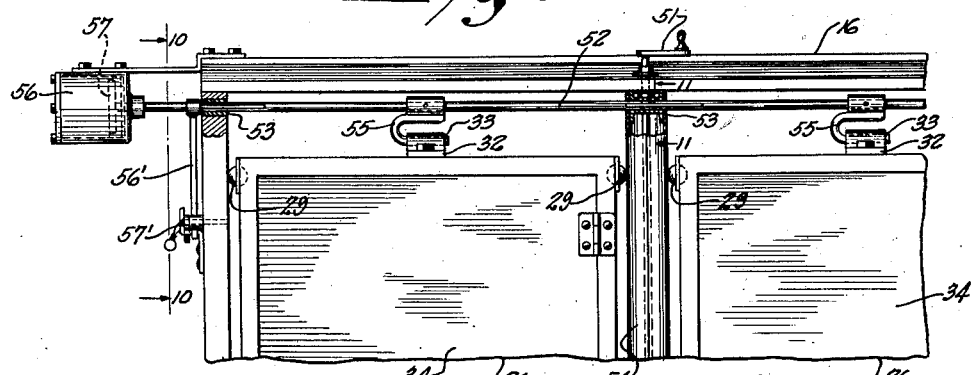
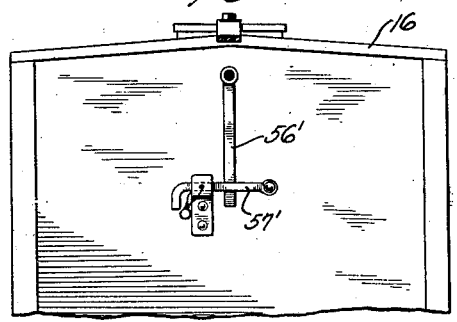
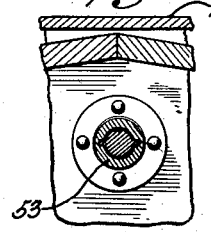

Patented Dec. 2, 1930

1,783,363

UNITED STATES PATENT OFFICE

ARMIN R. GROB, OF MILWAUKEE, WISCONSIN

SYSTEM FOR HANDLING FREIGHT AND APPARATUS THEREFOR

Application filed April 16, 1928. Serial No. 270,408.

This invention relates to improvements in system for handling freight and apparatus therefor.

It has been common practice heretofore to employ cranes for transferring containers from a freight car to a platform or motor truck. Needless to say, the containers required for this procedure had to be constructed of very heavy and durable material to withstand this strenuous method of handling, and to thus build the containers was found to entail considerable expense.

A further system, which has heretofore been proposed, provided for a transfer carriage movable alongside of the freight car, and a platform adjacent the transfer carriage. In this system it was proposed to have motor trucks back up against the platform. As it is not practical to both unload and load a truck in the same spot, the truck had to be repositioned and this necessitated driving forward and backing adjacent to a different portion of the platform. This procedure proved to be very inconvenient, and to result in considerable lost time.

It is one of the objects of this invention to overcome the aforementioned objections and to provide an improved system for handling freight and apparatus therefor, employing containers holding less than carload lots which may be constructed of a very light and inexpensive material, and to provide a simple and convenient means for transferring said containers from a railroad car to a road-going vehicle and vice versa.

It is a further object of this invention to provide an improved system in which a maximum number of containers can be handled by a minimum number of railroad cars and trucks in a minimum period of time and with a minimum amount of labor, thus eliminating the necessity of siding freight cars or delaying express freight trains.

It is a further object of this invention to provide a means for transferring and for shipping the containers, in both the freight cars and trucks, which gives the utmost protection to the containers, permitting them to be constructed lightly.

It is a further object of this invention to provide a novel system in which gravity means is employed for transferring the containers from the railroad car to the truck or to intermediate positions and vice versa.

It is a further object of this invention to provide casters or wheels on the containers or cooperating therewith to facilitate their transfer by gravity, and also to provide means for guiding the containers into proper positions.

It is a further object of this invention to provide means for releasably holding the containers in a desired position.

It is a further object of this invention to provide means in connection with the motor trucks for adjusting the body during the transfer to a standard and height corresponding to the height of the platform at which the transfer is being made, to eliminate spring deflection.

It is a further object of this invention to provide a system for handling freight and apparatus therefor which is simple, efficient, and well adapted for the purpose described.

With the above and other objects in view, the invention consists of the improved system for handling freight and apparatus therefor, and all its parts and combinations as set forth in the claims, and all equivalents thereof.

In the accompanying drawings, in which the same reference characters designate the same parts in all of the views:

Fig. 1 is a diagrammatic plan view of a station arrangement embodying the invention;

Fig. 2 is a sectional view taken on line 2—2 of Fig. 1;

Fig. 3 is a side elevation of a motor truck, part being broken away to show the containers within;

Fig. 4 is a rear end view of the truck;

Fig. 5 is a side elevation of a freight car, part being broken away to show the containers within;

Fig. 6 is a fragmentary, sectional view of a freight car, showing one compartment with a container positioned therein;

Fig. 7 is a sectional view taken on the line 7—7 of Fig. 6;

Fig. 8 is a sectional view taken on the line

8—8 of Fig. 6, showing portions of the adjacent containers in full;

Fig. 9 is a detail view of the upper end of the freight car, parts being broken away, and parts being shown in section;

Fig. 10 is a sectional view taken on the line 10—10 of Fig. 9; and

Fig. 11 is an enlarged sectional view taken on the line 11—11 of Fig. 9.

Referring to the drawing, the numeral 15 designates a railroad track upon which a freight car 16 is positioned. On each side of the track 15 are short tracks 17 and 18 along which transfer carriages 19 and 20 are adapted to move. Adjacent the short track 17 is a stationary platform 21, and adjacent the short track 18 is a similar stationary platform 22. A U-shaped runway 23 for motor vehicles 24 extends along each stationary platform and around one end. It is preferable to have the runway tunneled beneath the track 15 to allow the motor vehicles to travel from one side to the other when a train of freight cars is standing on the track. The runway, platforms, and tracks are all mounted on a foundation which is uniformly inclined from one side to the other, as shown in Fig. 2. The runway is provided with guiding recesses or tracks 25 to engage the truck wheels so that the trucks will be properly positioned alongside of the platforms when receiving or discharging containers.

The railroad track 15 begins to incline laterally at the lines A—A on each end of the foundation. The lateral inclination then gradually increases until at the lines B—B it is the same as the inclination of the foundation.

The bodies of the freight cars 16 are specially constructed with compartments 59, as shown in Figs. 5, 6, and 7, to receive a plurality of containers 26 for the material which is being transported. These containers may be constructed of a suitable frame 27, the sides of which may be covered with any light weight material, wire netting being very suitable. The bottom of each container is provided with a row of anti-friction ball casters 28 on each side adjacent the compartment walls 54, to allow the containers to roll readily when being moved. A number of casters are necessary in the row to support the container when it is being moved over a gap. Each side of the container adjacent the compartment walls is also provided with anti-friction casters 29 to engage the same.

It is to be understood that the side casters may be positioned on the compartment walls instead of on the containers. The compartments 59 need not be constructed substantially except at the portions engaged by the casters. Light steel framework may be used for the main portions thereof. This is true of the compartments used throughout the apparatus.

The compartment walls flare outwardly at each end, as at 54', to facilitate the transferring of containers to them. The compartment floors flare downwardly at each outside edge, as at 59', for the same purpose.

The bottom of each container is formed with a protruding portion 30, the edges 31 of which are adapted to engage stop blocks as will hereinafter be described more fully. On the top of each container is a lug 32 having an eye portion 33 for receiving a locking hook. This feature will also be hereinafter referred to more particularly. Each container is also provided with a door 34 and suitable lockings means 35 therefor.

In the floor of each compartment of the freight car is a pair of stop blocks 36, each block being adapted to engage an edge 31 of the depressed portion 30 on the bottom of the container to maintain the container in position. As each stop block and the mechanism for operating the same is identical, only one will be described in detail.

Each block 36 is secured to the upper end of a pair of threaded shafts 37 which latter extend through bores 38. The lower ends of the shafts are adapted to slide through bearing portions 39 and out through openings 40 in the bottom of the freight car. Threaded on the lower portion of each shaft is a bevel gear 41 which meshes with a second bevel gear 42. The latter is rigidly mounted on one end of a shaft extending through a bearing 43. On the other end of the latter shaft a gear 44 is rigidly mounted. The gears 44 are driven by worms 45 rigidly mounted on a shaft 46. On the outer end of the latter shaft a bevel gear 47 is secured. The gear 47 meshes with a bevel gear 48 secured to the lower end of a shaft 49 which extends vertically through bearings 50 to the roof of the freight car. A crank handle 51 is secured to the upper end of the shaft 49.

It is evident that by turning the crank, through the intermediate gearing, the block may be moved vertically to engage or release the container.

Extending lengthwise through an intermediate portion of the freight car above the containers is a long shaft 52 (see Figs. 5, 6, 7, 9, 10, and 11). The shaft extends through bearing portions 53 in the partitions 54. The shaft is splined in each bearing to prevent its turning but allowing lateral movement (see Figs. 9 and 11). Secured to the shaft are a plurality of hook members 55, one for each compartment. The hooks are arranged to simultaneously engage the eyes 33 in the lugs 32 of the containers to further lock the containers in place. The shaft may be operated by any suitable means, such as compressed air, as indicated. If the latter method is employed, the end of the shaft extends into a cylinder 56 and is provided with a piston 57. Compressed air may be admitted by suitable valves to each end of the cylinder for actuating the piston. The shaft may be locked against movement by means of the latch 57' engaging the extension 56'.

The freight car is provided with rolling doors 58 to allow the compartments to be readily exposed for loading and unloading.

The transfer carriages 19 and 20 are provided with a plurality of compartments 59 similar to the compartments in the freight cars. Each compartment is also provided with at least one stop block mechanism on its lower side identical with that used on the freight cars. The carriages are preferably propelled by electric motors 60 which may be supplied with current from storage batteries. Motor controls 61 are located on the roofs of the transfer carriages. Suitable brakes may be provided to allow proper positioning of the transfer carriages in registration with the compartments of the freight car or platform.

The stationary platforms are provided with rows of compartments 63. Stop blocks are used on the lower sides of these compartments just as in the transfer carriages.

The motor trucks 24 are specially constructed, preferably with a plurality of compartments 64 similar to the compartments in the freight cars. Each compartment is also provided with a pair of stop blocks 65 and mechanism for operating the same which are identical with the stop blocks already described for the freight cars. Each motor truck is further provided with a locking shaft 66 having hooks 67. The construction of this feature is also identical with the construction of the shaft used in the freight cars except that a compressed fluid is used preferably to compressed air.

When a loaded truck is driven alongside of the platform, it will be found that the weight of the containers and contents will depress the springs to such an extent that the body of the truck will be too low to discharge the contents onto the platform. To remedy this difficulty jacks 68 have been provided adjacent each spring. These jacks may be preferably operated by compressed fluid, from the same source as used to operate the locking shaft 66, to adjust the body to the proper height. When the truck is driven away, the jacks are of course lowered to permit the springs to function properly.

The operation of the system is as follows: The motor trucks laden with containers are driven in on the runway on the higher side of the foundation, as shown in Fig. 1, and are stopped exactly opposite vacant compartments in the platform 21. The jacks 68 are next operated to raise the body of the truck to the proper height for discharging the containers. The curtain of the truck adjacent the platform is then rolled up and the locking shaft 66 and the right-hand stop blocks 65 are operated to release the containers. The latter slide down the incline into the compartments on the platform 21. The stop blocks in the compartments have been raised to stop the containers when fully within the compartments. The truck is then driven around to the receiving side and the jacks are again operated to properly aline the body.

When it is desired to transfer the containers from the platform 21 to the freight car, the transfer carriage 19 is driven alongside of the platform and stopped in exact registration with the compartments, and the stop block mechanism is operated to allow the containers to slide onto the transfer carriage, just as was done in transferring them from the truck to the platform. The arrangement is such that the clearance between the vehicles and the platforms is the smallest possible with the view to proper operation of the apparatus.

The transfer carriage is then driven alongside of the freight car to be loaded, and the containers are again released and allowed to slide into the freight car where they are secured in place by the stop blocks 36 and the hooks 55, ready for transportation.

To unload a freight car, the containers are released from the other side and are permitted to slide onto the transfer carriage 20. From there they are deposited upon the platform 22 ready for loading upon an outgoing truck. The entire station arrangement is preferably roofed over for protection against the elements.

At the consignee's warehouse, an arrangement similar to that described here for the station may be used. However, for smaller requirements, the contents of the containers may be unloaded without removing the containers from the motor trucks.

It is not desired to limit the scope of this invention to the particular arrangement shown in Figs. 1 and 2, as various modifications may be made by any one skilled in the art without departing from the spirit of the invention. For example, the fixed platform could readily be eliminated, and the discharge could take place from the freight car to the transfer carriage and from the latter to the truck, or the transfer could be made directly between the freight car and the truck.

From the foregoing description it may be seen that the improved system for handling freight and apparatus therefor is very efficient and well adapted for the purpose described.

What I claim is:

1. In an apparatus for handling freight, the combination of a laterally inclined foundation, a vehicle positioned on said foundation, receiving means positioned on the foundation adjacent the vehicle, a movable container, and means on said vehicle and receiving means for releasably holding the container, said container, when released, being movable by the force of gravity from the vehicle to the receiving means.

2. In an apparatus for handling freight, the combination of a laterally inclined foundation, a vehicle positioned on said foundation, container supporting means positioned on said foundation adjacent the vehicle, a movable container, and means on the container supporting means and on the vehicle for releasably holding said container, said container, when released, being movable by the force of gravity from the container supporting means to the vehicle.

3. In an apparatus for handling freight, the combination of a laterally inclined foundation, a vehicle positioned on said foundation, a second vehicle movable adjacent to said first vehicle, receiving means positioned adjacent the second vehicle a movable container, and means on the vehicles and receiving means for releasably holding said container, said vehicles and receiving means extending at right angles to the direction of inclination of the foundation.

4. In an apparatus for handling freight the combination of a laterally inclined foundation, a railroad track on said foundation, a freight car on said track, a transfer carriage movable adjacent said railroad track, a platform adjacent said transfer carriage, a runway adjacent said platform, a road-going vehicle movable on said runway, a movable container, and means on the freight car, transfer carriage, platform, and road-going vehicle for releasably holding the container, said track, transfer carriage, platform, and runway, extending at right angles to the direction of inclination of the foundation.

5. In an apparatus for handling freight, the combination of a laterally inclined foundation, a railroad track on said foundation extending at right angles to its direction of inclination, a freight car on said track, a runway on each side of said track, a road-going vehicle movable on each runway, a movable container, means on the freight car and road-going vehicles for releasably holding said container, and means for utilizing the force of gravity due to the inclined foundation for transferring said container from the freight car to one of said road-going vehicles and from one of the road-going vehicles to the freight car.

6. In an apparatus for handling freight, the combination of a laterally inclined foundation, a railroad track extending along said foundation transversely to the direction of inclination, a freight car on said track, a short track on each side of said railroad track, a transfer carriage movable on each short track, a platform adjacent each short track, a runway extending along each platform and around an end of the foundation, a road-going vehicle movable on each of said runways, and a movable container, the force of gravity due to the inclined foundation being utilized to move said container to or from said vehicles and platforms.

7. In an apparatus for handling freight, the combination of a laterally inclined foundation, a railroad track extending on said foundation transversely to the direction of inclination, a freight car on said track, a transfer carriage movable adjacent said railroad track, a platform adjacent said transfer carriage, a runway adjacent said platform having guiding means in connection therewith, a road-going vehicle movable along said guiding means on the runway, a movable container, and means on the freight car, transfer carriage, platform, and road-going vehicle for releasably holding the container.

8. In an apparatus for handling freight, the combination of a laterally inclined foundation, a railroad track extending on said foundation transversely to the direction of inclination, a freight car on said track, a transfer carriage movable adjacent said railroad track, a platform adjacent said transfer carriage, a runway adjacent said platform having guiding means in connection therewith, a road-going vehicle movable along said guiding means on the runway, a movable container, and stop block means on the freight car, transfer carriage, platform, and road-going vehicle for releasably holding the container.

9. In an apparatus for handling movable freight containers, the combination of a uniformly laterally inclined foundation, and a plurality of container handling devices extending at right angles to the direction of inclination of the foundation and having decks, said decks normally being in alinement and being uniformly inclined due to the inclined foundation, to permit the transfer of the movable containers by the force of gravity from one device to the other.

10. The method of handling freight consisting of removably mounting movable containers with freight therein on a vehicle, driving said vehicle on a uniformly laterally inclined foundation on which a receiving means is positioned, alining the deck of the vehicle with the deck of the receiving means, and transferring the containers by the force of gravity due to the inclined foundation, from the vehicle to the receiving means.

11. A station arrangement comprising a railroad track, a short track on each side of said railroad track and parallel thereto, a transfer carriage movable on each of said short tracks, a platform adjacent each of the short tracks, and a runway for road-going vehicles extending adjacent each platform and around an end thereof.

12. In an apparatus for handling freight, the combination of a uniformly inclined supporting means, freight containers having rolling members movable on said supporting means, stop block means in connection with said inclined supporting means engaging said containers to hold the same in place, and means for releasing said stop block means.

13. In an apparatus for handling freight, the combination of an inclined foundation, a vehicle movable on said foundation at right angles to the direction of inclination thereof, a movable freight container, a pair of stop blocks in connection with said vehicle for engaging opposite portions of said container to hold the same in place, one of said stop blocks preventing movement in one direction and the other of said stop blocks preventing movement in the other direction according to which ever side of the vehicle is lower on the incline, and independent means for releasing each stop block to permit movement of the container by the force of gravity.

14. The method of handling freight in interchangeable containers of less than carload size, consisting of mounting a laterally movable container having roller means on a vehicle, maintaining the container thereon by stop blocks engaging opposite portions of the container, moving said vehicle onto a laterally inclined foundation adjacent a receiving means for a plurality of containers, said receiving means being inclined in a similar manner to said foundation and having a stop block for each container, vertically aligning the container supporting means of the vehicle with said receiving means, and releasing said stop block on the vehicle which is on the lower side of the incline to allow said container to roll by the force of gravity from the vehicle onto said receiving means until held thereon by said stop block on the receiving means.

15. The method of handling freight in containers, consisting of laterally mounting a plurality of containers having rolling means on a vehicle into apportioned spaces, holding all of the containers therein by releasable locking means, further holding each container individually by a pair of stop blocks engaging opposite portions thereof, moving said vehicle onto a laterally inclined foundation adjacent to a receiving means which is similarly inclined and which is adapted to receive a larger number of containers than said vehicle, vertically aligning the container supporting portion of the vehicle with said receiving means, releasing said means for simultaneously locking the containers in the vehicle, and further releasing those stop blocks in the vehicle which are on the lower side of the incline to allow the containers to roll by gravity from the apportioned spaces in the vehicle into apportioned spaces in the receiving means.

16. In an apparatus for handling freight, the combination of a laterally inclined foundation, a vehicle having a deck positioned on said foundation, the deck being inclined due to the position on the inclined foundation, receiving means positioned on the foundation adjacent the vehicle, a movable container, means on the vehicle receiving means for releasably holding said container, said container when released being movable by the force of gravity from the vehicle to the receiving means, and means in said vehicle and in connection with said receiving means for guiding the containers into desired positions.

17. In an apparatus for handling freight, the combination of a laterally inclined foundation, a vehicle having a deck and springs for yieldingly supporting said deck positioned on said foundation, receiving means positioned on the foundation adjacent the vehicle, a movable container, means on said vehicle and receiving means for releasably holding the container, and jack means in connection with said vehicle for raising said vehicle deck to a level with the receiving means, thereby eliminating spring deflection to permit said containers to move by the force of gravity from said vehicle to the receiving means when said holding means on the vehicle is released.

18. In an apparatus for handling freight in interchangeable containers of less than carload size, the combination of a laterally inclined foundation, a pair of container supporting members positioned opposite one another in the line of inclination of said foundation, one of said container supporting members consisting of a vehicle having wheels, guiding means for said vehicle wheels extending at substantially right angles to the line of inclination of the foundation, a container movable by gravity from the container supporting member which is higher on the inclined foundation to the other container supporting member, means in connection with each of the container supporting members for releasably holding the container thereon, and guiding means in connection with each of the container supporting members for guiding the container in its movement by gravity from one of the container supporting members to the other.

In testimony whereof, I affix my signature.

ARMIN R. GROB.